(12) United States Patent
Tang et al.

(10) Patent No.: US 10,544,520 B2
(45) Date of Patent: Jan. 28, 2020

(54) MULTIFUNCTIONAL VISCOSE FIBER AND PREPARATION METHOD THEREFOR

(71) Applicant: JINAN SHENGQUAN GROUP SHARE HOLDING CO., LTD., Shandong (CN)

(72) Inventors: Yilin Tang, Shandong (CN); Jinzhu Zhang, Shandong (CN); Yingfu Zheng, Shandong (CN); Shuyun Zhang, Shandong (CN); Xiaomin Liu, Shandong (CN); Ripeng Xu, Shandong (CN)

(73) Assignee: JINAN SHENGQUAN GROUP SHARE HOLDING CO., LTD., Shandong (CN)

( * ) Notice: Subject to any disclaimer, the term of this patent is extended or adjusted under 35 U.S.C. 154(b) by 0 days.

(21) Appl. No.: 15/576,158

(22) PCT Filed: May 5, 2016

(86) PCT No.: PCT/CN2016/081120
§ 371 (c)(1),
(2) Date: Nov. 21, 2017

(87) PCT Pub. No.: WO2016/188310
PCT Pub. Date: Dec. 1, 2016

(65) Prior Publication Data
US 2018/0209071 A1 Jul. 26, 2018

(30) Foreign Application Priority Data
May 22, 2015 (CN) .......................... 2015 1 0267761

(51) Int. Cl.
| | | |
|---|---|---|
| *D01F 2/10* | (2006.01) | |
| *C01B 32/184* | (2017.01) | |
| *C01B 32/194* | (2017.01) | |
| *D01F 2/08* | (2006.01) | |
| *C01B 32/20* | (2017.01) | |
| *D01D 5/06* | (2006.01) | |

(52) U.S. Cl.
CPC .............. *D01F 2/10* (2013.01); *C01B 32/184* (2017.08); *C01B 32/194* (2017.08); *C01B 32/20* (2017.08); *D01F 2/08* (2013.01); *D01D 5/06* (2013.01)

(58) Field of Classification Search
CPC ....... D01F 2/10; C01B 32/184; C01B 32/194; D01D 5/06
USPC .......................................................... 536/60
See application file for complete search history.

(56) References Cited

U.S. PATENT DOCUMENTS

| | | | | |
|---|---|---|---|---|
| 2012/0244333 A1* | 9/2012 | Aksay | ....................... | D01F 1/09 428/221 |
| 2014/0018480 A1 | 1/2014 | Lee et al. | | |

FOREIGN PATENT DOCUMENTS

| | | |
|---|---|---|
| CN | 1376814 A | 10/2002 |
| CN | 1779004 A | 5/2006 |
| CN | 1936124 B | 3/2007 |
| CN | 102337602 A | 2/2012 |
| CN | 102614871 A | 8/2012 |
| CN | 103966690 A | 8/2014 |
| CN | 104326523 A | 2/2015 |
| CN | 104353842 A | 2/2015 |
| CN | 104399998 A | 3/2015 |
| CN | 104831389 A | 8/2015 |
| CN | 105266238 A | 1/2016 |
| CN | 105603554 A | 5/2016 |
| CN | 106012148 A | 10/2016 |
| CN | 106192063 A | 12/2016 |
| CN | 106579573 A | 4/2017 |
| CN | 106723389 A | 5/2017 |
| KR | 20120077772 A | 7/2012 |
| KR | 20130033794 A | 4/2013 |
| KR | 20140120075 A | 10/2014 |
| WO | 2010107762 A1 | 9/2010 |
| WO | 2015042583 A2 | 3/2015 |
| WO | 2016188310 A1 | 12/2016 |

(Continued)

OTHER PUBLICATIONS

Tang et al. Graphene Oxide-Silver Nanocomposite As a Highly Effective Antibacterial Agent with Species-Specific Mechanisms. ACS Appl. Mater. Interfaces 2013, 5, 3867-3874. (Year: 2013).*

(Continued)

*Primary Examiner* — Yih-Horng Shiao
(74) *Attorney, Agent, or Firm* — Faegre Baker Daniels LLP (57) ABSTRACT

Provided is a multifunctional viscose fiber comprising viscose fibers, graphene and nanosilver, wherein the nanosilver is loaded on the graphene in situ. Provided is a method for preparing multifunctional viscose fibers including: a) dispersing graphene in an aqueous solution to obtain a graphene dispersion solution, b) dissolving a silver salt into the graphene dispersion solution, and adding a reducing agent to perform a reduction reaction to obtain a nanosilver-loaded graphene dispersion solution, and c) uniformly mixing the nanosilver-loaded graphene dispersion solution with a viscose solution, and performing spinning to obtain the multifunctional viscose fibers. Experimental results show that as compared to viscose fibers with no nanosilver-loaded graphene added, the multifunctional viscose fibers have a far infrared temperature increase performance increased by not less than 100%, an ultraviolet protecting coefficient increased by not less than 70%, and an antibacterial activity reaching 99.9% and increased by not less than 100%.

10 Claims, 4 Drawing Sheets

(56) References Cited

FOREIGN PATENT DOCUMENTS

WO    2017071360 A1    5/2017

OTHER PUBLICATIONS

Sevilla et al. Graphitic carbon nanostructures from cellulose. Chemical Physics Letters 490 (2010) 63-68. (Year: 2010).*

Xue et al. Hydrogen peroxide modification enhances the ability of biochar (hydrochar) produced from hydrothermal carbonization of peanut hull to remove aqueous heavy metals: Batch and col. tests. Chemical Engineering Journal 200-202 (2012) 673-680. (Year: 2012).*

Kvitek et al. Antibacterial activity and toxicity of silver-nanosilver versus ionic silver. Journal of Physics: Conference Series 304 (2011) 012029, p. 1-8. (Year: 2011).*

"10,000 Scientific Puzzles." in: "10,000 Scientific Problems" Information Science Editorial Board, Science Press, 2011-9, pp. 1021-1024.

Baojiang, Jiang. "Preparation and Properties of Graphene-Based Composites," in: Heilongjiang University Press, 2014, p. 5.

Chook, Soon Wei; et al. "A Graphene Oxide Facilitated a Highly Porous and Effective Antibacterial Regenerated Cellulose Membrane Containing Stabilized Silver Nanoparticles," Cellulose, 21:4261-4270, 2014.

Chook, Soon Wei; et al. "Antibacterial Hybrid Cellulose-Graphene Oxide Nanocomposite Immobilized With Silver Nanoparticles," RSC Advances, 5:26263-26268, 2015.

International Preliminary Report on Patentability issued in PCT/CN2016/081120, dated Dec. 7, 2017, 16 pages with English translation.

International Search Report and Written Opinion issued in PCT/CN2016/081120, dated Jul. 26, 2016, 21 pages with English translation.

European Supplemental Search Report issued in EP Application 16799199.1, dated Oct. 31, 2018, 6 pages.

* cited by examiner

MULTIFUNCTIONAL VISCOSE FIBER AND PREPARATION METHOD THEREFOR

CROSS-REFERENCE TO RELATED APPLICATION

This application is a national phase application of PCT Application No. PCT/CN2016/081120, internationally filed May 5, 2016, which claims priority to Chinese Application No. 201510267761.8, filed on May 22, 2015, all of which are herein incorporated by reference in their entirety.

TECHNICAL FIELD

The present disclosure relates to the field of viscose fibers, and more particularly to a multifunctional viscose fiber and preparation method thereof.

BACKGROUND

Viscose fiber is mainly prepared by using high-purity cellulose dissolving pulp as raw material, which is prepared from cellulose derived from cotton linter, wood and plant straw by a series of processes of acid hydrolysis, alkali hydrolysis, bleaching and others, and by a series of processes of alkali impregnation, pressing, aging, yellowing, dissolving, filtering, spinning, post-processing and others. Ordinary viscose fiber has similar properties with cotton fiber, having wearing comfortability, good hygroscopicity and dyeability, and has advantages which other chemical fibers cannot match. Multifunctional viscose fiber has become one of the hotspots of research, as the consumer has higher and higher requirements on functions of clothing and other materials, such as far infrared, anti-ultraviolet, anti-radiation, anti-static, antibacterial and bacteriostatic functions.

Currently, the prior art discloses a variety of multifunctional viscose fibers. For example, Chinese Patent Application No. 200510104907.3 discloses a silver-containing antibacterial viscose fiber and preparation method thereof, and the method comprises steps of mixing, making glue, spinning, beaming, cutting, refining, drying, packing, and a colloidal solution of nanosilver with a nanoparticle size of 50-65 nm was added during the process of making glue or spinning. The viscose fiber obtained by this method has strong antibacterial, bactericidal and certain anti-static functions. However, this method cannot well solve the problem of agglomeration of nanosilver particles in the process of making glue and spinning, which affects the effect of nanosilver particles. Moreover, in this method, since nanosilver colloidal solution was directly added, although the obtained viscose fiber has bacteriostatic property, other properties such as far infrared, anti-radiation properties and others, are not prominent. Accordingly, the present inventors have considered the preparation of a multifunctional viscose fiber having good far infrared, anti-ultraviolet, anti-radiation, anti-static, bacteriostatic, antibacterial and other functions.

SUMMARY

In view of this, the purpose of the present invention is to provide a multifunctional viscose fiber and preparation method thereof. The multifunctional viscose fiber provided in the present invention has uniform distribution of nanoparticles and has good far-infrared, anti-ultraviolet, anti-radiation, anti-static, bacteriostatic and antibacterial properties, etc.

The present invention provides a multifunctional viscose fiber comprising: viscose fibers, graphene and nanosilver, wherein the nanosilver is loaded in situ on the graphene sheet.

Preferably, the graphene is prepared by the following process:
bleaching cellulose with hydrogen peroxide or sodium hypochlorite to obtain a first intermediate product;
activating the first intermediate product with an activator to obtain a second intermediate product, the activator being one or more of nickel salts, iron salts, cobalt salts or manganese salts; and
carbonizing the second intermediate product at 600° C. to 1400° C. under a condition of a protective gas, and performing post-treatment to obtain a graphene.

Preferably, the nanosilver accounts for 1 wt % to 50 wt % of the graphene; and the graphene accounts for 0.01 wt % to 10 wt % of the viscose fibers.

Preferably, the nanosilver accounts for 2 wt % to 30 wt % of the graphene; and the graphene accounts for 0.1 wt % to 5 wt % of the viscose fibers.

Preferably, the cellulose is a porous cellulose; and the activator is one or more of nickel chloride, nickel nitrate, nickel sulfate, nickel acetate, ferric chloride, ferrous chloride, ferric nitrate, ferric sulfate, ferrous sulfate, ferric acetate, cobalt chloride, cobalt nitrate, cobalt sulfate, cobalt acetate, manganese chloride, manganese nitrate, manganese sulfate and manganese acetate.

The present invention also provides a method for preparing a multifunctional viscose fiber, characterized by comprising:
a) dispersing graphene in an aqueous solution to obtain a graphene dispersion solution;
b) dissolving a silver salt into the graphene dispersion solution, and adding a reducing agent to perform a reduction reaction to obtain a solution of nanosilver-loaded graphene; and
c) uniformly mixing the solution of nanosilver-loaded graphene with a viscose solution, and performing spinning to obtain a multifunctional viscose fiber.

Preferably, the graphene is prepared by the following process:
bleaching cellulose with hydrogen peroxide or sodium hypochlorite to obtain a first intermediate product;
activating the first intermediate product with an activator to obtain a second intermediate product, the activator being one or more of nickel salts, iron salts, cobalt salts or manganese salts; and
carbonizing the second intermediate product at 600° C. to 1400° C. under a condition of a protective gas, and performing post-treatment to obtain a graphene.

Preferably, said step a) specifically comprises:
a1) ultrasonically dispersing graphene in water, centrifuging or standing to obtain a homogeneous graphene dispersion solution;
a2) mixing the homogeneous graphene dispersion solution with a stabilizer to obtain a stable graphene dispersion solution.

Preferably, in step a2), the stabilizer is one or more of sodium carboxymethylcellulose, polyvinyl alcohol, Tween 80, sodium dodecyl sulfate or sodium dodecylbenzenesulfonate.

Preferably, in step b), the silver salt is silver nitrate, and the reducing agent is one or more of sodium borohydride, ethylene glycol, glucose or citric acid; and the molar ratio of the reducing agent to the silver salt is 1-10:1

Preferably, after the reducing agent is added and reduction reaction is performed in step b), the resulting reaction product is subjected to ultrasonic treatment.

Preferably, the ultrasonic treatment is performed for 10 min to 60 min.

Compared with the prior art, the present invention firstly obtains a nanosilver-loaded graphene by liquid phase synthesis in situ, and then obtains a viscose fiber added with nanosilver and graphene by adding the nanosilver-loaded graphene to a viscose solution and spinning. The obtained viscose fiber has good far-infrared, anti-ultraviolet, anti-static, anti-radiation, bacteriostatic and antibacterial properties, etc.

Applicant in this research found that: the viscose fiber obtained by only adding graphene has improved antibacterial property and anti-radiation property, but the improvement is not obvious; the viscose fiber obtained by only adding nanosilver has a higher requirement on the degree of dispersion of nanosilver particles, and the improvements of far infrared temperature increase performance, anti-ultraviolet performance and anti-radiation performance of this viscose fiber are not obvious; the viscose fiber obtained by adding both nanosilver and graphene prepared by improved Hummers method also has non-obvious improvements in far-infrared performance, antibacterial performance and anti-radiation performance; however, the viscose fiber obtained by firstly loading nanosilver onto graphene sheet and then adding the nanosilver-loaded graphene into viscose fiber has effectively improved far-infrared performance, antibacterial performance and anti-radiation performance, wherein, by loading nanosilver onto graphene prepared by improved Hummers method and then adding the nanosilver-loaded graphene into viscose fiber can effectively improve far-infrared performance, antibacterial performance and anti-radiation performance of the obtained viscose fiber; by loading nanosilver in situ onto graphene having less sheet defects prepared by specific methods and then adding the nanosilver-loaded graphene into viscose fiber can significantly improve far-infrared performance, antibacterial performance and anti-radiation performance of the obtained viscose fiber. Experimental results show that as compared to viscose fiber with no nanosilver-loaded graphene added, the multifunctional viscose fiber prepared by the present invention has a far infrared temperature increase performance increased by not less than 100%, an ultraviolet protecting coefficient increased by not less than 70%, and a bacteriostatic performance reaching 99.9% and increased by not less than 100%, while the viscose fibers prepared by other methods have a far infrared temperature increase performance increased by less than 50%, an ultraviolet protecting coefficient increased by less than 40%, and a bacteriostatic performance increased by less than 50%.

BRIEF DESCRIPTION OF DRAWINGS

In order to illustrate the examples of the present invention or the technical solutions in the prior art more clearly, drawings which are required in the descriptions of examples and the prior art will be briefly described in the following. Obviously, the following drawings are only examples of the present invention, and those skilled in the art can obtain other drawings based on the drawings provided herein without paying creative work.

DESCRIPTION

The technical solutions in the examples of the present invention will be described clearly and completely in the following with reference to the accompanying drawings in the examples of the present invention. Obviously, the described examples are merely part of but not all of the examples of the present invention. All other examples obtained by those ordinary skilled in the art based on the examples of the present invention without making creative work fall within the protection scope of the present invention.

The present invention provides a multifunctional viscose fiber comprising viscose fibers, graphene and nanosilver, wherein the nanosilver is loaded in situ on the graphene sheet.

The present invention utilizes graphene as a carrier. The graphene is firstly loaded with nanosilver and then added into viscose fibers, which can remarkably improve the properties of the viscose fiber, such as far-infrared, anti-ultraviolet, anti-radiation, anti-static, antibacterial and bacteriostatic properties, etc.

The graphene is not particularly limited in the present invention, and the graphene prepared by an improved Hummers method may be used.

In order to obtain a viscose fiber with better properties, the graphene used in the present invention is preferably prepared by the following process:
1) bleaching cellulose with hydrogen peroxide or sodium hypochlorite to obtain a first intermediate product;

in the present invention, the mass of the hydrogen peroxide or sodium hypochlorite is preferably 1% to 10% by mass of the porous cellulose, more preferably 2% to 8%; in the present invention, the temperature for bleaching with hydrogen peroxide or sodium hypochlorite is preferably 60° C. to 130° C., more preferably 80° C. to 100° C.; the time for bleaching with hydrogen peroxide or sodium hypochlorite is preferably 1 hour (h) to 10 h, more preferably 2 h to 8 h;
2) activating the first intermediate product with an activator to obtain a second intermediate product;

in the present invention, the activation temperature is preferably 20° C. to 180° C., more preferably 50° C. to 150° C., and most preferably 80° C. to 140° C.; in the present invention, the mixing time is preferably 2 h to 10 h, more preferably 5 h to 7 h;
3) carbonizing the second intermediate product at 600° C. to 1400° C. under a condition of a protective gas, and performing post-treatment to obtain an active porous graphene;

in the present invention, the carbonization time is 2 h to 12 h, preferably 4 h to 8 h.

The cellulose is a porous cellulose.

The method for preparing the porous cellulose comprises the following steps: A) hydrolyzing a biomass resource in an acid to obtain lignocellulose, wherein the biomass resource includes one or more of plants, and agroforestry wastes; B)

treating the lignocellulose to obtain a porous cellulose, wherein the treatment includes acid treatment, salt treatment or organic solvent treatment. In the present invention, the temperature for hydrolysis is preferably 90° C. to 180° C., more preferably 120° C. to 150° C. In the present invention, the time for hydrolysis is preferably 2 h to 10 h, more preferably 2 h to 8 h, and most preferably 3 h to 6 h. In the present invention, the acid for hydrolysis is preferably one or more of sulfuric acid, nitric acid, hydrochloric acid, formic acid, sulfurous acid, phosphoric acid and acetic acid, more preferably sulfuric acid, nitric acid hydrochloric acid or acetic acid, and most preferably sulfuric acid, nitric acid or hydrochloric acid. In the present invention, the amount of acid used in the hydrolysis is preferably 3 weight percent (wt %) to 20 wt %, more preferably 5 wt % to 15 wt %, and most preferably 8 wt % to 12 wt % of the biomass resource.

In the present invention, the salt treatment is preferably carried out by an acidic sulfite process treatment or an alkali sulfite process treatment. In the present invention, the pH value during the acidic sulfite process treatment is preferably 1 to 7, more preferably 2 to 5, and most preferably 3 to 4. In the present invention, the temperature for the acidic sulfite process treatment is preferably 70° C. to 180° C., more preferably 90° C. to 150° C., and most preferably 100° C. to 120° C. In the present invention, the time for the acidic sulfite process treatment is preferably 1 h to 6 h, more preferably 2 h to 5 h, and most preferably 3 h to 4 h.

In the present invention, the acid in the acidic sulfite process treatment is preferably sulfuric acid. In the present invention, the amount of acid used in the acidic sulfite process treatment is preferably 4 wt % to 30 wt %, more preferably 8 wt % to 25 wt %, and most preferably 10 wt % to 20 wt % of the lignocellulose. In the present invention, the weight percent concentration of the acid in the acidic sulfite process treatment is preferably such that the liquid to solid ratio is (2-20):1, more preferably (4-16):1, and most preferably (8-12):1.

In the present invention, the sulfite in the acidic sulfite process treatment is preferably calcium sulfite, magnesium sulfite, sodium sulfite or ammonium sulfite, and more preferably magnesium sulfite or sodium sulfite. The amount of sulfite used in the acidic sulfite process treatment of the present invention is not particularly limited, and the amount of sulfite used in the sulfite pulping process well known to those skilled in the art can be used.

In the present invention, the pH value in the alkali sulfite process treatment is preferably 7 to 14, more preferably 8 to 13, and most preferably 9 to 12. In the present invention, the temperature for the alkali sulfite process treatment is preferably 70° C. to 180° C., more preferably 90° C. to 150° C., and most preferably 100° C. to 120° C. In the present invention, the time for the alkali sulfite process treatment is preferably 1 h to 6 h, more preferably 2 h to 5 h, and most preferably 3 h to 4 h In the present invention, the alkali in the alkali sulfite process treatment is preferably calcium hydroxide, sodium hydroxide, ammonium hydroxide or magnesium hydroxide, and more preferably sodium hydroxide or magnesium hydroxide. In the present invention, the amount of the alkali used in the alkali sulfite process treatment is preferably 4 wt % to 30 wt %, more preferably 8 wt % to 25 wt %, and most preferably 10 wt % to 20 wt % of the lignocellulose. In the present invention, the weight percentage concentration of the alkali in the alkali sulfite process treatment is preferably such that the liquid to solid ratio is (2-20):1, more preferably (4-16):1, and most preferably (8-12):1.

In the present invention, the sulfite in the alkali sulfite process treatment is preferably calcium sulfite, magnesium sulfite, sodium sulfite or ammonium sulfite, and more preferably magnesium sulfite or sodium sulfite. The amount of sulfite used in the alkali sulfite process treatment of the present invention is not particularly limited, and the amount of sulfite used in the sulfite pulping process well known to those skilled in the art can be used.

The biomass resource in step A) is agroforestry wastes.

The agroforestry waste includes one or more of corn stalk, corn cob, sorghum stalk, beet residue, bagasse, furfural residue, xylose residue, sawdust, cotton stalk and reed.

The agroforestry waste is corn cob.

The acid in step A) includes one or more of sulfuric acid, nitric acid, hydrochloric acid, formic acid, sulfurous acid, phosphoric acid and acetic acid.

The amount of acid in step A) is from 3% to 20% by weight of the biomass resource.

The temperature for hydrolysis in step A) is from 90° C. to 180° C.;

The time for hydrolysis in step A) is from 10 min to 10 h.

The salt treatment in step B) is carried out by an acidic sulfite process treatment or an alkali sulfite process treatment.

The pH value in the acidic sulfite process treatment is from 1 to 7.

The amount of acid used in the acidic sulfite process treatment is from 4 wt % to 30 wt % of the lignocellulose;

The weight percent concentration of the acid in the acidic sulfite process treatment is such that the liquid to solid ratio is (2-20):1.

The temperature for the acidic sulfite process treatment is 70° C. to 180° C.;

The time for the acidic sulfite process treatment is 1 h to 6 h.

The pH value in the alkali sulfite process treatment is preferably 7 to 14;

The amount of the alkali used in the alkali sulfite process treatment is 4 wt % to 30 wt % of the lignocellulose.

The weight percentage concentration of the alkali in the alkali sulfite process treatment is such that the liquid to solid ratio is (2-20):1.

The temperature for the alkali sulfite process treatment is 70° C. to 180° C.;

The time for the alkali sulfite process treatment is 1 h to 6 h.

The mass ratio of the activator to the cellulose in the step 2) is (0.05-0.9):1.

The activator is one or more of nickel chloride, nickel nitrate, nickel sulfate, nickel acetate, ferric chloride, ferrous chloride, ferric nitrate, ferric sulfate, ferrous sulfate, ferric acetate, cobalt chloride, cobalt nitrate, cobalt sulfate, cobalt acetate, manganese chloride, manganese nitrate, manganese sulfate or manganese acetate.

The protective gas in step 3) is selected from one or more of nitrogen and inert gases.

The cellulose referred to in the present invention is preferably corncob cellulose. Corncob cellulose fibers are short, and have good dispersibility, a small cross-density between the fibers, and are enhanced in activity by bleaching with hydrogen peroxide or sodium hypochlorite. Meanwhile, under the catalysis of the metal activator and nitrogen protection, the temperature does not need to be greatly changed, and an activated biomass graphene is obtained at 600° C. to 1400° C. The prepared activated biomass graphene has good electrical conductivity and good dispersibility in solution. The experimental results show that the conductivity of the activated biomass graphene prepared by the method provided in the present invention can reach up to 40,000 S/m.

The graphene prepared by the above method was subjected to transmission electron microscopy test. The results show that the sheet of the graphene is thin, and the graphene is a biomass graphene having not more than 10 layers, for example 3-7 layers. The graphene prepared by the above method was subjected to Raman spectroscopy test. The results show that the graphene has a high degree of $Sp^2$ hybridization. The conductivity of the biomass graphene prepared by the above method was tested by a conductivity tester. The results show that the conductivity of the biomass graphene can be up to 40,000 S/m. In summary, the activated porous graphene prepared by the above-mentioned method is thin and has a high degree of $Sp^2$ hybridization.

In the multifunctional viscose fiber provided by the present invention, nanosilver is loaded in situ in the graphene prepared by the above-mentioned method, preferably loaded on the surface of the graphene sheet. By loading in situ, the nanosilver can be uniformly distributed in the structure of the graphene sheet, and the particle size of the nanosilver particles is controllable and uniform. In the present invention, the nanosilver preferably accounts for 2 wt % to 50 wt %, more preferably 5 wt % to 20 wt % of the graphene. In the present invention, the particle size of the nanosilver is preferably less than 50 nm.

In the multifunctional viscose fiber provided by the present invention, the graphene preferably accounts for 0.01 wt % to 5 wt %, more preferably 0.1 wt % to 3 wt % of the viscose fiber.

In the multifunctional viscose fiber provided by the present invention, the viscose fiber may be one or more of corncob cellulose, reed cellulose, bamboo cellulose, corn stalk cellulose, cotton stalk cellulose, wood pulp cellulose, or a cellulose raw material prepared by waste residues such as xylose residue and bagasse, and the present invention is not particularly limited thereto.

In the multifunctional viscose fiber provided by the present invention, the silver nanoparticles are completely loaded on the surface of the graphene sheet and covalently bonded, so that the prepared solution of graphene loaded with silver nanoparticles does not need to be subjected to subsequent filtration and dehydration step, and can maintain the stable dispersion of the solution of nanosilver-loaded graphene, such that the solution can be directly mixed with viscose solution. In addition, in the present invention, the nanosilver-loaded graphene was added to the viscose fiber without affecting the wearing comfortability of the viscose fiber and the subsequent color adjusting and color matching process.

The multifunctional viscose fiber provided by the present invention has good far-infrared function and can be used in far-infrared fabric or clothing to improve the temperature of the human body surface.

The multifunctional viscose fiber provided by the present invention has good antibacterial, deodorization and other functions, and can be used for preparing antibacterial mask, underwear, deodorant socks, bandage and gauze.

The multifunctional viscose fiber provided by the present invention has good anti-ultraviolet, anti-static, anti-radiation and other functions, and can be used for preparing anti-ultraviolet, anti-static and anti-radiation fabrics and clothing.

The present invention also provides a method for preparing a multifunctional viscose fiber comprising:

a) dispersing graphene in an aqueous solution to obtain a graphene dispersion solution;

b) dissolving a silver salt into the graphene dispersion solution, and adding a reducing agent to perform a reduction reaction to obtain a solution of nanosilver-loaded graphene; and c) uniformly mixing the solution of nanosilver-loaded graphene with a viscose solution, and performing spinning to obtain a multifunctional viscose fiber.

After the graphene was prepared according to the method described above, it was dispersed in water to obtain a graphene dispersion solution. In particular, the graphene dispersion solution can be obtained by the following method:

a1) ultrasonically dispersing graphene in water, centrifuging or standing to obtain a homogeneous graphene dispersion solution;

a2) mixing the homogeneous graphene dispersion solution with a stabilizer to obtain a stable graphene dispersion solution.

Firstly, the graphene is ultrasonically dispersed in water, and then centrifuged or allowed to stand to be stratified, and the supernatant is a stable dispersion of the graphene colloidal solution. In the present invention, the time for ultrasonic dispersion is 10 minutes (min) to 120 min, more preferably 30 min to 100 min. The condition for centrifugation treatment is 1000 rpm to 4000 rpm, more preferably 1500 rpm to 3500 rpm, and the time for centrifugation treatment is 2 min to 30 min, more preferably from 5 min to 10 min. The time for standing is preferably 20 h to 30 h, more preferably 24 h. The mass ratio of the graphene to water is preferably 0.01-5:100, more preferably 0.1-3.5:100.

The obtained homogeneous graphene dispersion solution is mixed with a stabilizer to stabilize the dispersion of the graphene, preventing the agglomeration of the graphene colloidal solution. In the present invention, the stabilizer is a surfactant including, but not limited to, Tween-type surfactants, sulfonate-based surfactants or sulfate-based surfactants, and the like, preferably sodium dodecyl benzene sulfonate (SDBS), sodium dodecyl sulfate (SDS) or Tween 80, and the like. The addition amount of the stabilizer is not specifically limited in the present invention, as long as it can maintain the stable dispersion of the graphene colloidal solution.

After the graphene dispersion solution is obtained, a silver salt is dissolved in the graphene dispersion solution, and a reducing agent is also added to perform reduction reaction to obtain a solution of nanosilver-loaded graphene. In the present invention, the silver salt is preferably silver nitrate. In the present invention, the silver salt is preferably dissolved in the graphene dispersion solution under stirring, and the addition amount of silver nitrate is 1 wt % to 50 wt %, more preferably 5 wt % to 30 wt % of the graphene. The reducing agent is preferably sodium borohydride, ethylene glycol, glucose or citric acid, and more preferably sodium borohydride. In the present invention, the reducing agent is preferably added under stirring; and the molar ratio of the reducing agent to the silver salt is preferably 1-10:1, more preferably 2-8:1; the reaction is preferably carried out under stirring at room temperature; and the reaction time is preferably 30 min to 120 min, more preferably 50 min to 100 min.

After completion of the reaction, the obtained reaction product is subjected to ultrasonic treatment to obtain a solution of nanosilver-loaded graphene. The time for the ultrasonic treatment is preferably 10 min to 60 min, more preferably 20 min to 50 min.

After the solution of nanosilver-loaded graphene is obtained, it is homogeneously mixed with the viscose solution, and a multifunctional viscose fiber can be obtained after spinning. In the present invention, the proportion of graphene in the viscose fiber is preferably 0.1‰ to 5%, more preferably 0.1% to 3%. In the present invention, the solution of nanosilver-loaded graphene is preferably added to the viscose solution slowly and mixed with quick stirring to make the dispersion solution of nanosilver-loaded graphene fully mixed.

In the present invention, the viscose solution is a viscous solution well-known in the art, and the preparation method thereof is carried out by using a pulp as a raw material, and by processes such as impregnating, pressing, pulverizing, aging, yellowing, dissolving, ripening, filtering and defoaming. The pulp was impregnated with an aqueous solution of sodium hydroxide at a concentration of about 18% to convert cellulose into alkali cellulose, and hemicellulose was dissolved out, and the degree of polymerization was partially lowered, and then the excess lye was removed by pressing step; the bulk alkali cellulose became a loose floc after being crushed on a pulverizer, resulting in an increase in the subsequent chemical reaction uniformity due to the increase of surface area. Alkali cellulose was subjected to oxidative cracking in the role of oxygen, reducing the average degree of polymerization, which is called aging. After aging, alkali cellulose was reacted with carbon disulfide to form cellulose sulfonate, which is called sulfonation, making the hydrogen bonds between macromolecules further weakened. Due to the hydrophilicity of sulfonic acid groups, the solubility of cellulose in dilute alkali solution was greatly improved. The solid cellulose sulfonate was dissolved in dilute alkali solution, and a viscose solution was obtained.

After the viscose solution was obtained, the dispersion solution of nanosilver-loaded graphene was added therein according to the above-mentioned method, and then spinning was carried out according to methods well known to those skilled in the art to obtain a multifunctional viscose fiber. The just-made viscose solution is not easy to shape due to higher viscosity and salt value, and also need to be placed at a certain temperature for a certain period of time after adding the dispersion solution of nanosilver-loaded graphene, i.e. ripening, to make sodium cellulose sulfonate in the viscose hydrolyzed and saponified gradually, and degree of esterification decreased, and the stability of the effect of viscosity on the electrolyte would also change accordingly. After ripening, defoaming and filtering were carried out to remove air bubbles and impurities, and then spinning was carried out according to methods well known to those skilled in the art.

The source of the pulp is not limited in the present invention, and may be corncob cellulose, reed cellulose, bamboo cellulose, corn stalk cellulose, cotton stalk cellulose, wood pulp cellulose, or a cellulose raw material prepared by waste residues such as xylose residue and bagasse.

In the multifunctional viscose fiber provided by the present invention, the silver nanoparticles are completely loaded on the surface of the graphene sheet and covalently bonded, so that the prepared solution of graphene loaded with silver nanoparticles does not need to be subjected to subsequent filtration and dehydration step, and can maintain the stable dispersion of the solution of nanosilver-loaded graphene, such that the solution can be directly mixed with viscose solution.

The multifunctional viscose fiber provided by the present invention has good far infrared function, anti-ultraviolet, anti-static, anti-radiation, antibacterial and bacteriostatic functions, etc., and can be used for preparing far-infrared fabric or clothing, antibacterial mask, underwear, deodorant socks, bandage, gauze, anti-ultraviolet clothing, anti-static clothing, and anti-radiation clothing, etc.

The multifunctional viscose fiber provided by the present invention and preparation method thereof are further illustrated below in combination with examples.

Example 1

Corn cob was hydrolyzed in sulfuric acid at 120° C. for 30 min to obtain lignocellulose, wherein the mass of the sulfuric acid was 3% of the mass of the corn cob;

The lignocellulose was subjected to an acidic sulfite process treatment at 70° C. for 1 h to obtain a porous cellulose, wherein the pH value in the acidic sulfite process was 1, the acid was sulfuric acid, the sulfite was magnesium sulfite, the mass of the sulfuric acid was 4% of the mass of the lignocellulose, and the liquid to solid ratio was 2:1;

The porous cellulose was bleached with hydrogen peroxide, wherein the mass of hydrogen peroxide was 5% of the mass of the porous cellulose, the bleaching temperature for bleaching with hydrogen peroxide was 100° C., and the bleaching time was 5 hours.

The bleached porous cellulose was activated with nickel chloride at 20° C. under stirring for 2 hours, wherein the mass ratio of the nickel chloride and the porous cellulose was 0.1:1; and the resulting activated product was dried at 70° C. to obtain a product having a water content of less than 10% by weight;

The above product was placed in a carbonization furnace, and nitrogen gas was introduced into the carbonization furnace as a protective gas at a gas introduction rate of 200 mL/min, and the temperature was raised to 800° C. and kept for 6 hours and then cooled to 60° C. or lower;

At a temperature of 60° C., the cooled product was washed for 4 hours in an aqueous solution of sodium hydroxide having a mass concentration of 3% to obtain a first washed product; at 70° C., the first washed product was washed for 4 hours in an aqueous solution of hydrochloric acid having a mass concentration of 4% to obtain a second washed product; the second washed product was washed with distilled water to neutral and dried to obtain a biomass graphene.

Figure 1:
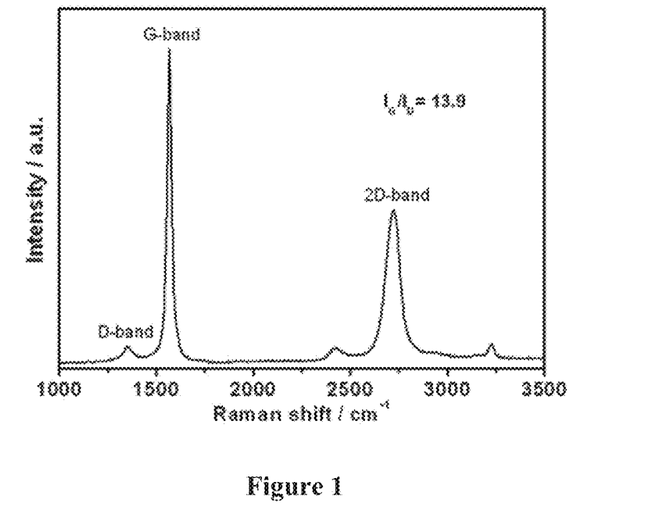
FIG. 1 is a Raman spectrum of graphene obtained in Example 1 of the present invention.
Figure 2:
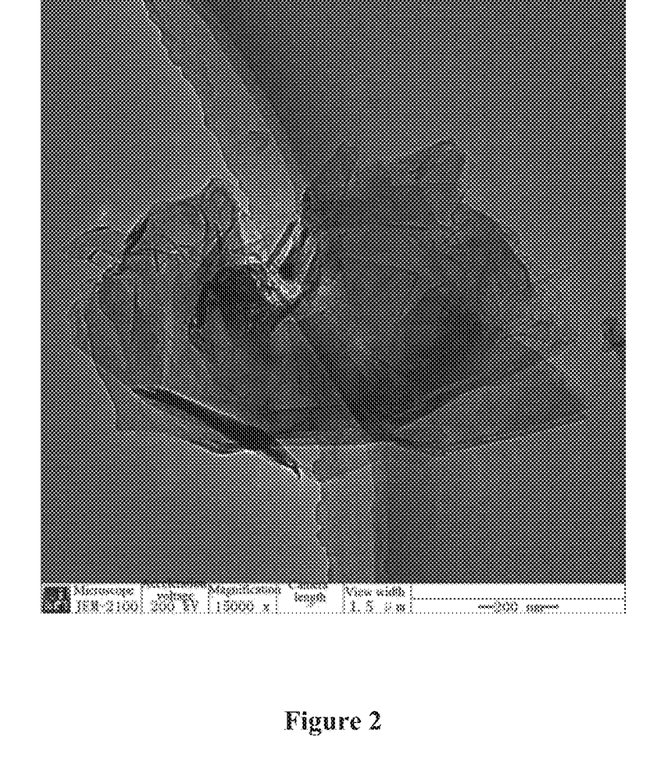
FIG. 2 is a transmission electron micrograph of graphene obtained in Example 1 of the present invention.
Figure 3:
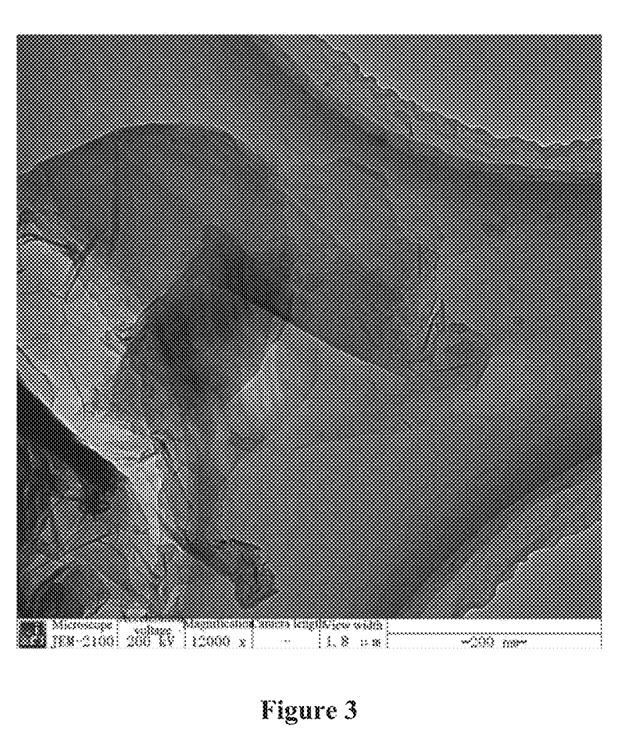
FIG. 3 is a transmission electron micrograph of graphene obtained in Example 1 of the present invention.

The obtained graphene was subjected to Raman spectroscopy test, and the result was shown in FIG. 1. FIG. 1 is a Raman spectrum of graphene obtained in Example 1 of the present invention. As seen from FIG. 1, the graphene prepared by the method provided by Example 1 of the present invention has a high degree of $Sp^2$ hybridization. The graphene prepared by Example 1 of the present invention was subjected to transmission electron microscopy test, and the results were shown in FIGS. 2-3. FIGS. 2-3 are transmission electron micrographs of the graphene obtained in Example 1 of the present invention. As can be seen from FIGS. 2-3, the sheet of the graphene prepared by Example 1 of the present invention is thin, and the graphene is a biomass graphene having 10 layers or less.

Example 2

1 g of the graphene prepared in Example 1 was ultrasonically dispersed in 100 g of water for 100 min and centrifuged at 2000 rpm for 5 min. The supernatant was obtained and SDS was added to the supernatant to obtain a graphene colloidal solution. The graphene colloidal solution was again ultrasonically dispersed in water for 100 min to obtain a graphene colloidal solution.

The above graphene colloidal solution was ultrasonically dispersed again in water for 100 min to obtain a graphene dispersion solution. 0.02 mol/L silver nitrate was added to the graphene dispersion solution under stirring, dissolved under stirring away from light, and then 0.2 mol/L sodium borohydride solution was slowly added and the mixture was reacted at room temperature for 100 min; wherein the mass ratio of silver nitrate to graphene is 1:10, and the molar ratio of sodium borohydride to silver nitrate is 10:1.

The reactants obtained after the reaction were sonicated for 30 min to obtain a solution of nanosilver-loaded graphene.

Sulfonated corncob cellulose was dissolved in dilute sodium hydroxide solution, and then the above solution of nanosilver-loaded graphene was added therein, and an 8% viscose solution was obtained after ripening, and then the viscose solution was stirred at a high speed for 1 h, wherein graphene was 0.1% of corncob cellulose. A multifunctional viscose fiber was obtained after filtering, defoaming, and then spinning, desulfurizing, water-washing, and drying. Wherein, coagulation bath composition was: sulfuric acid 105 g/L, sodium sulfate 200 g/L, and zinc sulfate 12 g/L.

Figure 4:
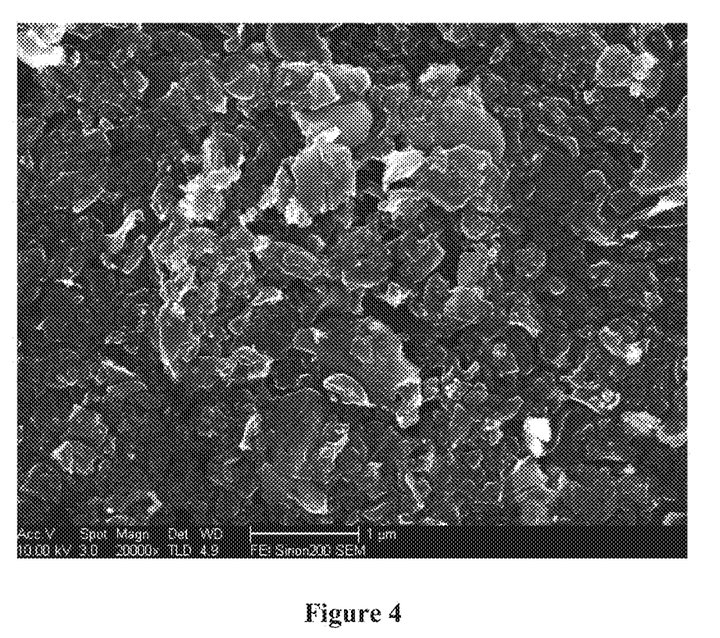
FIG. 4 is a scanning electron micrograph of graphene without nanosilver loaded.
Figure 5:
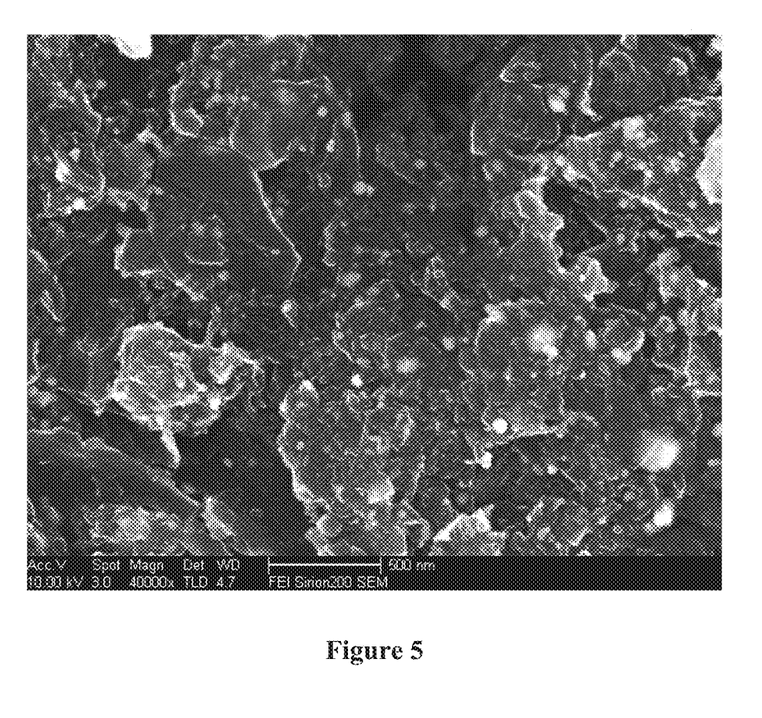
FIG. 5 is a scanning electron micrograph of graphene loaded with nanosilver.
Figure 6:
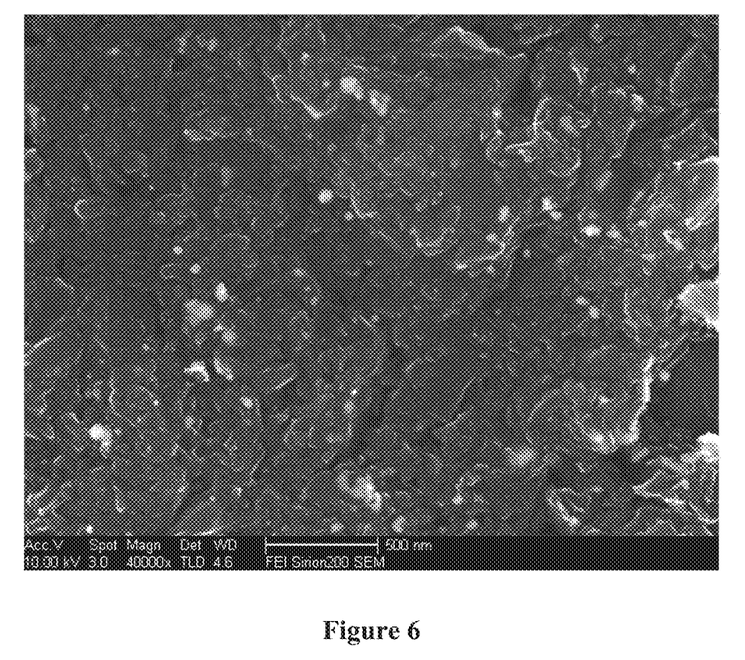
FIG. 6 is a scanning electron micrograph of graphene loaded with nanosilver.

The obtained solution of nanosilver-loaded graphene was leached, and the filtrate is collected and washed until there is no silver ion in the filtrate, and then was dried at 60° C. under vacuum to obtain a nanosilver-loaded graphene. The nanosilver-loaded graphene was scanned by a scanning electron microscope, and the results are shown in FIGS. 4, 5 and 6. FIG. 4 is a scanning electron micrograph of graphene without nanosilver loaded; FIGS. 5 and 6 are scanning electron micrographs of graphene loaded with nanosilver. As can be seen from FIGS. 4-6, in the method provided by the present invention, the nanosilver has a uniform particle size and a uniform loading on the surface of graphene.

Example 3

A multifunctional viscose fiber was prepared according to the method and steps disclosed in Example 2, except that corn stalk cellulose was used instead of corncob cellulose.

Example 4

A multifunctional viscose fiber was prepared according to the method and steps disclosed in Example 2, except that the mass ratio of silver nitrate to graphene is 1:100.

Example 5

A multifunctional viscose fiber was prepared according to the method and steps disclosed in Example 2, except that the mass ratio of silver nitrate to graphene is 1:2.

Example 6

A multifunctional viscose fiber was prepared according to the method and steps disclosed in Example 2, except that graphene was 0.05% of corncob cellulose.

Example 7

A multifunctional viscose fiber was prepared according to the method and steps disclosed in Example 2, except that graphene was 5% of corncob cellulose.

Example 8

A multifunctional viscose fiber was prepared according to the method and steps disclosed in Example 2, except that solution of nanosilver-loaded graphene was prepared according to the following method:

100 ml of $AgNO_3$ aqueous solution with a concentration of 0.02 M was added into 0.3 g of graphene prepared in Example 1 and dispersed by ultrasonic three times. 19 mL of an aqueous solution of $NaBH_4$ with a concentration of 0.2 M was slowly added dropwise therein under rapid stirring, and then the stirring was continued for 2 h until reduction reaction was completed.

Example 9

A multifunctional viscose fiber was prepared according to the method and steps disclosed in Example 8, except that 80 mL of an aqueous solution of $NaBH_4$ with a concentration of 0.05 M was slowly added dropwise.

Example 10

A multifunctional viscose fiber was prepared according to the method and steps disclosed in Example 8, except that 5 mL of an ethylene glycol solution with a concentration of 0.2 M was slowly added dropwise.

Comparative Example 1

Sulfonated corncob cellulose was dissolved in dilute sodium hydroxide solution, and an 8% viscose solution was obtained after ripening, and then the viscose solution was stirred at a high speed for 1 h. A viscose fiber was obtained after filtering, defoaming, and then spinning, desulfurizing, water-washing, and drying. Wherein, coagulation bath composition was: sulfuric acid 105 g/L, sodium sulfate 200 g/L, and zinc sulfate 12 g/L.

Comparative Example 2

The graphene prepared in Example 1 was ultrasonically dispersed in water for 100 min to obtain a graphene dispersion solution.

Sulfonated corncob cellulose was dissolved in dilute sodium hydroxide solution, and then the above graphene dispersion solution was added therein, and an 8% viscose solution was obtained after ripening, and then the viscose solution was stirred at a high speed for 1 h, wherein graphene was 0.1% of corncob cellulose. A viscose fiber was obtained after filtering, defoaming, and then spinning, desulfurizing, water-washing, and drying. Wherein, coagulation bath composition was: sulfuric acid 105 g/L, sodium sulfate 200 g/L, and zinc sulfate 12 g/L.

Comparative Example 3

Nanosilver was ultrasonically dispersed in water for 100 min to obtain a nanosilver dispersion solution.

Sulfonated corncob cellulose was dissolved in dilute sodium hydroxide solution, and then the above nanosilver dispersion solution was added therein, and a 8% viscose solution was obtained after ripening, and then the viscose solution was stirred at a high speed for 1 h, wherein nanosilver was 0.1% of corncob cellulose. A viscose fiber was obtained after filtering, defoaming, and then spinning, desulfurizing, water-washing with, and drying. Wherein, coagulation bath composition was: sulfuric acid 105 g/L, sodium sulfate 200 g/L, and zinc sulfate 12 g/L.

Comparative Example 4

The graphene prepared in Example 1 was ultrasonically dispersed in water for 100 min to obtain a graphene dispersion solution.

Nanosilver was ultrasonically dispersed in water for 100 min to obtain a nanosilver dispersion solution.

Sulfonated corncob cellulose was dissolved in dilute sodium hydroxide solution, and then the above nanosilver dispersion solution and graphene dispersion solution were added therein, and a 8% viscose solution was obtained after ripening, and then the viscose solution was stirred at a high speed for 1 h, wherein nanosilver was 0.1% of corncob cellulose and graphene dispersion solution was 0.1% of corncob cellulose. A viscose fiber was obtained after filtering, defoaming, and then spinning, desulfurizing, water-washing, and drying. Wherein, coagulation bath composition was: sulfuric acid 105 g/L, sodium sulfate 200 g/L, and zinc sulfate 12 g/L.

Comparative Example 5

A graphene was prepared by modified Hummers method using graphite powder as a raw material. The prepared graphene was ultrasonically dispersed in water for 100 min to obtain a graphene dispersion solution.

Nanosilver was ultrasonically dispersed in water for 100 min to obtain a nanosilver dispersion solution.

Sulfonated corncob cellulose was dissolved in dilute sodium hydroxide solution, and then the above nanosilver dispersion solution and graphene dispersion solution were added therein, and a 8% viscose solution was obtained after ripening, and then the viscose solution was stirred at a high speed for 1 h, wherein nanosilver was 0.1% of corncob cellulose and graphene dispersion solution was 0.1% of corncob cellulose. A viscose fiber was obtained after filtering, defoaming, and then spinning, desulfurizing, water-washing, and drying. Wherein, coagulation bath composition was: sulfuric acid 105 g/L, sodium sulfate 200 g/L, and zinc sulfate 12 g/L.

Example 11

A graphene was prepared by modified Hummers method using graphite powder as a raw material. The prepared graphene was ultrasonically dispersed in water for 100 min to obtain a graphene dispersion solution.

0.02 mol/L silver nitrate was added to the graphene dispersion solution under stirring, dissolved under stirring away from light, and then 0.2 mol/L sodium borohydride solution was slowly added and the mixture was reacted at room temperature for 100 min; wherein the mass ratio of silver nitrate to graphene is 1:10, and the molar ratio of sodium borohydride to silver nitrate is 10:1.

The reactants obtained after the reaction were sonicated for 30 min to obtain a solution of nanosilver-loaded graphene.

Sulfonated corncob cellulose was dissolved in dilute sodium hydroxide solution, and then the above solution of nanosilver-loaded graphene was added therein, and an 8% viscose solution was obtained after ripening, and then the viscose solution was stirred at a high speed for 1 h, wherein graphene dispersion solution was 0.1% of corncob cellulose. A viscose fiber was obtained after filtering, defoaming, and then spinning, desulfurizing, water-washing, and drying. Wherein, coagulation bath composition was: sulfuric acid 105 g/L, sodium sulfate 200 g/L, and zinc sulfate 12 g/L.

Comparative Example 6

A graphene oxide was prepared by modified Hummers method using graphite powder as a raw material. The prepared graphene oxide was ultrasonically dispersed in water for 100 min to obtain a graphene oxide dispersion solution.

0.02 mol/L silver nitrate was added to the graphene oxide dispersion solution under stirring, dissolved under stirring away from light, and then 0.2 mol/L sodium borohydride solution was slowly added and the mixture was reacted at room temperature for 100 min; wherein the mass ratio of silver nitrate to graphene oxide is 1:10, and the molar ratio of sodium borohydride to silver nitrate is 10:1.

The reactants obtained after the reaction were sonicated for 30 min to obtain a nanosilver-loaded graphene oxide solution.

Sulfonated corncob cellulose was dissolved in dilute sodium hydroxide solution, and then the above nanosilver-loaded graphene oxide solution was added therein, and a 8% viscose solution was obtained after ripening, and then the viscose solution was stirred at a high speed for 1 h, wherein the graphene oxide dispersion was 0.1% of the corncob cellulose. A viscose fiber was obtained after filtering, defoaming, and then spinning, desulfurizing, water-washing, and drying. Wherein, coagulation bath composition was: sulfuric acid 105 g/L, sodium sulfate 200 g/L, and zinc sulfate 12 g/L.

Application Example

Properties of viscose fibers prepared in Examples 2 to 11 and Comparative Examples 1 to 6 were tested as follows:

Far infrared function was tested according to CAS 115-2005 "Health Care Functional Textiles" and GBT 7287-2008 infrared radiation heater test method; anti-ultraviolet property was evaluated according to GBT 18830-2002; anti-static property was evaluated according to GB/T 12703.1-2008; and antibacterial and bacteriostatic property was evaluated according to GB/T 20944.3-2008.

The results are shown in Table 1. Table 1 shows the test results of properties of the viscose fibers prepared in the examples and comparative examples of the present invention.

TABLE 1

|  | Far infrared temperature increase property (° C., 30 s) | UV protection factor (UPF) | Half-life (s) anti-static property | Antibacterial and bacteriostatic property % |
|---|---|---|---|---|
| Example 2 | 3.3 | 5.5 | 1.7 | 99.8 |
| Example 3 | 3.2 | 5.2 | 1.7 | 99.5 |
| Example 4 | 3.3 | 4.4 | 1.8 | 90.3 |
| Example 5 | 3.4 | 6.6 | 1.5 | 99.1 |
| Example 6 | 2.4 | 5.1 | 1.9 | 94.5 |
| Example 7 | 11 | 7.5 | 1.2 | 99.9 |
| Example 8 | 3.3 | 5.4 | 1.6 | 99.9 |
| Example 9 | 3.3 | 5.3 | 1.7 | 95.7 |
| Example 10 | 3.3 | 5.3 | 1.6 | 95.3 |
| Example 11 | 3.0 | 5.2 | 1.8 | 99.3 |
| Comparative Example 1 | 1.6 | 3.2 | 2.6 | 45.3 |

TABLE 1-continued

| | Far infrared temperature increase property (° C., 30 s) | UV protection factor (UPF) | Half-life (s) anti-static property | Antibacterial and bacteriostatic property % |
|---|---|---|---|---|
| Comparative Example 2 | 2.3 | 3.7 | 2.0 | 72.3 |
| Comparative Example 3 | 1.7 | 3.4 | 2.1 | 75.8 |
| Comparative Example 4 | 2.3 | 3.6 | 1.6 | 75.4 |
| Comparative Example 5 | 2.2 | 3.7 | 2.0 | 70.6 |
| Comparative Example 6 | 2.2 | 3.6 | 2.0 | 74.5 |

As can be seen from Table 1, the multifunctional viscose fibers provided by the present invention have large improvements in far infrared property, anti-ultraviolet property, anti-static property, antibacterial and bacteriostatic property.

The above examples are only preferred embodiments of the present invention. It should be noted that several changes and modifications may be made by those skilled in the art without departing from the principles of the present invention, and these changes and modifications should be regarded as the protection scope of the present invention.

The invention claimed is:

1. A multifunctional viscose fiber comprising:
   viscose fibers;
   graphene or graphite; and
   nanosilver, wherein the nanosilver is loaded in situ on the graphene or graphite, wherein the multifunctional viscose fiber is prepared by:
   a) dispersing graphene or graphite in an aqueous solution to obtain a graphene or graphite dispersion solution;
   b) dissolving a silver salt into the graphene or graphite dispersion solution, and adding a reducing agent to perform a reduction reaction to obtain a solution of nanosilver-loaded graphene or graphite, wherein the silver salt is silver nitrate and the mass ratio of silver nitrate to graphene or graphite is from 1:10 to 1:1;
   c) uniformly mixing the solution of nanosilver-loaded graphene or graphite with a viscose solution; and
   d) spinning the mixture to obtain the multifunctional viscose fiber.

2. The multifunctional viscose fiber of claim 1, wherein the graphene or graphite is prepared by the following process:
   bleaching cellulose with hydrogen peroxide or sodium hypochlorite to obtain a first intermediate product;
   activating the first intermediate product with an activator to obtain a second intermediate product, the activator being one or more of nickel salts, iron salts, cobalt salts or manganese salts; and
   carbonizing the second intermediate product at 600 to 1400° C. under a condition of a protective gas, and performing post-treatment to obtain the graphene or graphite.

3. The multifunctional viscose fiber of claim 1, wherein the nanosilver accounts for 1 wt % to 50 wt % of the graphene or graphite; and the graphene or graphite accounts for 0.01 wt % to 10 wt % of the viscose fiber.

4. The multifunctional viscose fiber of claim 3, wherein the nanosilver accounts for 2 wt % to 30 wt % of the graphene or graphite; and the graphene or graphite accounts for 0.1 wt % to 5 wt % of the viscose fiber.

5. The multifunctional viscose fiber of claim 2, wherein the cellulose is a porous cellulose; and the activator is one or more of nickel chloride, nickel nitrate, nickel sulfate, nickel acetate, ferric chloride, ferrous chloride, ferric nitrate, ferric sulfate, ferrous sulfate, ferric acetate, cobalt chloride, cobalt nitrate, cobalt sulfate, cobalt acetate, manganese chloride, manganese nitrate, manganese sulfate and manganese acetate.

6. A method for preparing the multifunctional viscose fiber of claim 1, the method comprising:
   a) dispersing graphene or graphite in an aqueous solution to obtain a graphene or graphite dispersion solution;
   b) dissolving a silver salt into the graphene or graphite dispersion solution, and adding a reducing agent to perform a reduction reaction to obtain a solution of nanosilver-loaded graphene or graphite, wherein the silver salt is silver nitrate and the mass ratio of silver nitrate to graphene or graphite is from 1:10 to 1:1;
   c) uniformly mixing the solution of nanosilver-loaded graphene or graphite with a viscose solution; and
   d) spinning the mixture to obtain the multifunctional viscose fiber.

7. The method of claim 6, wherein the step a) specifically comprises:
   a1) ultrasonically dispersing graphene or graphite in aqueous solution, and centrifuging or allowing the aqueous solution to stand to obtain a homogeneous graphene or graphite dispersion solution;
   a2) mixing the homogeneous graphene or graphite dispersion solution with a stabilizer to obtain a stable graphene or graphite dispersion solution.

8. The method of claim 7, wherein in step a2), the stabilizer is one or more of sodium carboxymethylcellulose, polyvinyl alcohol, Tween 80, sodium dodecyl sulfate or sodium dodecylbenzenesulfonate.

9. The method of claim 6, wherein in step b), the reducing agent is one or more of sodium borohydride, ethylene glycol, glucose or citric acid; and the molar ratio of the reducing agent to the silver salt is 1-10:1.

10. The method of claim 6, wherein after the reducing agent is added and reduction reaction is performed in step b), the resulting reaction product is subjected to ultrasonic treatment.

* * * * *